US012774760B2

(12) United States Patent
Tarabzouni

(10) Patent No.: US 12,774,760 B2
(45) Date of Patent: Oct. 27, 2026

(54) GATE VALVE SYSTEM

(71) Applicant: Saudi Arabian Oil Company, Dhahran (SA)

(72) Inventor: Mohanned Tarabzouni, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/069,896

(22) Filed: Mar. 4, 2025

(65) Prior Publication Data

US 2026/0266394 A1 Sep. 10, 2026

(51) Int. Cl.

*F16K 39/04* (2006.01)
*F16K 3/32* (2006.01)
*F17D 3/01* (2006.01)

(52) U.S. Cl.

CPC ................ *F16K 39/04* (2013.01); *F16K 3/32* (2013.01); *F16K 2200/402* (2021.08); *F17D 3/01* (2013.01)

(58) Field of Classification Search

CPC ...... F16K 39/04; F16K 3/32; F16K 2200/402; F17D 3/01

See application file for complete search history.

(56) References Cited

U.S. PATENT DOCUMENTS 6,698,444 B1 * 3/2004 Enston ................. C10M 147/02 137/246.22
9,371,951 B2 * 6/2016 Miller ....................... B23P 6/04
10,358,891 B2 7/2019 Knott
11,583,984 B2 * 2/2023 Alshiha ................. F16K 43/003
11,946,567 B1 4/2024 Tarabzouni
2022/0128155 A1 * 4/2022 Janse Van Rensburg .................. F16K 3/0254

* cited by examiner

*Primary Examiner* — Craig M Schneider
*Assistant Examiner* — Christopher D Ballman
(74) *Attorney, Agent, or Firm* — Fish & Richardson P.C.

(57) ABSTRACT

A valve system includes a gate valve that includes a lower body that defines a first through-hole and a second through-hole. The valve system further includes a side valve assembly. The side valve assembly includes a first valve configured to be fluidly coupled to the first through-hole of the lower body, a second valve configured to be fluidly coupled to the second through-hole of the low body, and an injection fitting configured to be fluidly coupled to the lower body of the gate valve. The injection fitting is configured to receive a sealing fluid to be flowed to the lower body of the gate valve to seal at least one of the first sealing seat or the second sealing seat.

20 Claims, 9 Drawing Sheets

GATE VALVE SYSTEM

TECHNICAL FIELD

The present disclosure relates to a gate valve system.

BACKGROUND

Valves are used in piping systems to regulate the flow of fluids in pipes and other fluid conduits. Some valves can be used to form a seal between two fluid flow pathways (e.g., pipes) connected to the valves. Forming a seal prevents fluids from leaking across the valve, allowing the valve to interrupt the fluid flow within a pipe.

SUMMARY

The present disclosure describes methods, devices, systems and techniques for a valve system that includes a gate valve and a side valve assembly configured to be attached to the gate valve for injecting sealant into the gate valve, bleeding the gate valve and checking isolation of the gate valve.

The details of one or more implementations of the subject matter described in this specification are set forth in the accompanying drawings and the description below. Other features, aspects, and advantages of the subject matter will become apparent from the description, the drawings, and the claims.

Figures 1A, 1B, 1C:
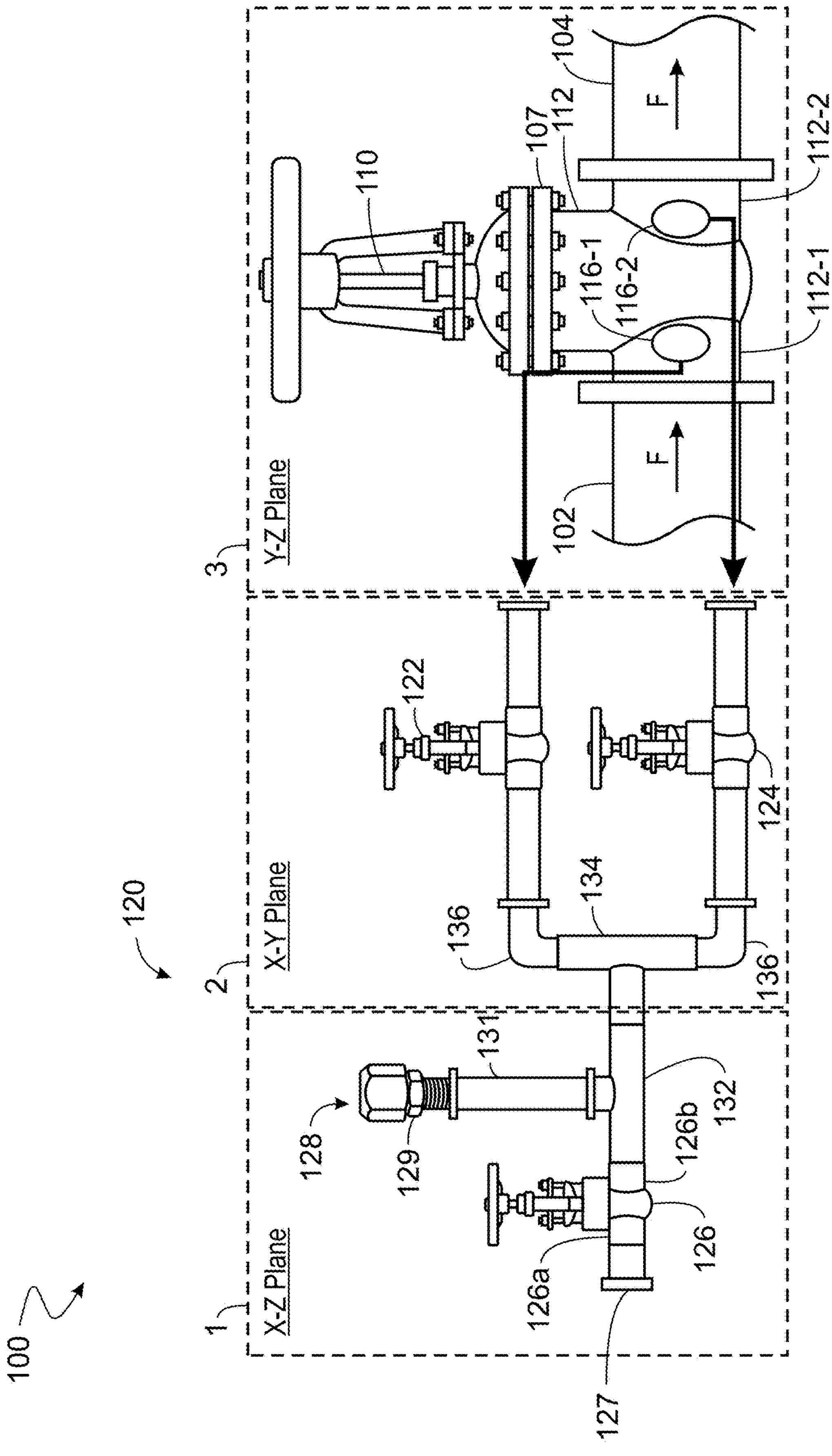
FIG. 1A illustrates a schematic view of a first portion of an example of a valve system in X-Z plane.
FIG. 1B illustrates a schematic view of a second portion of the example of the valve system in X-Y plane.
FIG. 1C illustrates a schematic view of a third portion of the example of the valve system in Y-Z plane.

It is to be understood that the various exemplary implementations shown in the figures are merely illustrative representations and are not necessarily drawn to scale.

DETAILED DESCRIPTION

This disclosure describes a valve system that includes a gate valve and a side valve assembly configured to be attached to the gate valve. The side valve assembly includes three valves and an injection fitting. The side valve assembly is fitted to a side of the gate valve to make the gate valve a double block and bleed (DBB) valve. One of the valves has an outlet that can be opened to an ambient environment (e.g., the external environment at atmospheric pressure) to drain the gate valve. The injection fitting allows a sealant to be injected into the gate valve, allowing the gate valve to be inline repairable. Further, two of the three valves are fluidly coupled to the same side of a lower body of the gate valve, with a first valve being upstream of a first sealing seat of the gate vale and a second valve being downstream of a second sealing seat of the gate valve. The second valve can be used as a check port to check the isolation of the gate valve.

The valve system can be implemented in various hydrocarbon extraction and processing environment, e.g., a processing facility, a well system, a pump station, and/or a drain system. In some implementations, the valve system is used in a processing facility. For example, the valve system can be integrated into pipelines that transport hydrocarbon streams during refining, separation, or chemical processing. The valve system in a processing facility can be used to regulate the hydrocarbon streams, bleed the gate valve, seal it for repairs in the event of internal leakage, or check the isolation of the gate valve. In some implementations, the valve system is used in a well environment, e.g., positioned within a wellhead assembly or production pipeline. The valve system can be used to regulate the flow of well fluids (e.g., crude oil, natural gas, and/or produced water), bleed the gate valve, seal it for repairs in the event of internal leakage, or check the isolation of the gate valve.

Implementations of the present disclosure can provide one or more of the following technical advantages. For example, the techniques described herein provides a DBB valve system that enables the gate valve to be inline repairable and drained, saving time and resources. Additionally, the techniques enhance operation safety of the valve system. For example, an injection port of the injecting fitting can be configured to be oriented in an upward direction. This upward orientation can help direct any released gas or liquid (e.g., hydrocarbon release) away from operators, rather than toward them, thereby reducing the operator's exposure to potential leaks or sprays during connection or disconnection of an injection pump and/or a hose. Further, the techniques allow safe handling of both gas and liquid through the valve system. For example, the techniques enable fluid (e.g., liquid or gas) to flow horizontally or downward during draining of the gate vale to help prevent the accumulation of stagnant fluid in the side valve assembly, thereby reducing the risk of damage to components of the side valve assembly caused by prolonged exposure to the stagnant fluid. Accumulated liquid inside the side valve assembly may also require additional pressure to drain it completely. By positioning a third valve at a level same as or lower than first and second holes of the lower body along a vertical direction, the gate valve can be more effectively drained under gravity. Finally, the techniques enable isolation checking of the gate valve. For example, during the isolation checking, a second valve in the side valve assembly that is downstream of sealing seats can be used as check port to verify whether the valve is properly isolating fluid. The port can be used to detect if there is any leakage (e.g., passing fluid, pressure) beyond the gate valve, which may indicate a potential issue with the isolation of the gate valve.

FIGS. 1A-1C illustrate schematic views of an example of a valve system 100. It is to be noted that FIGS. 1A-1C together form a composite view, illustrating different components of the valve system 100 from different planes for clarity. For example, the valve system 100 includes three portions 1, 2, 3, illustrated in FIGS. 1A-1C, respectively.

Figure 2:
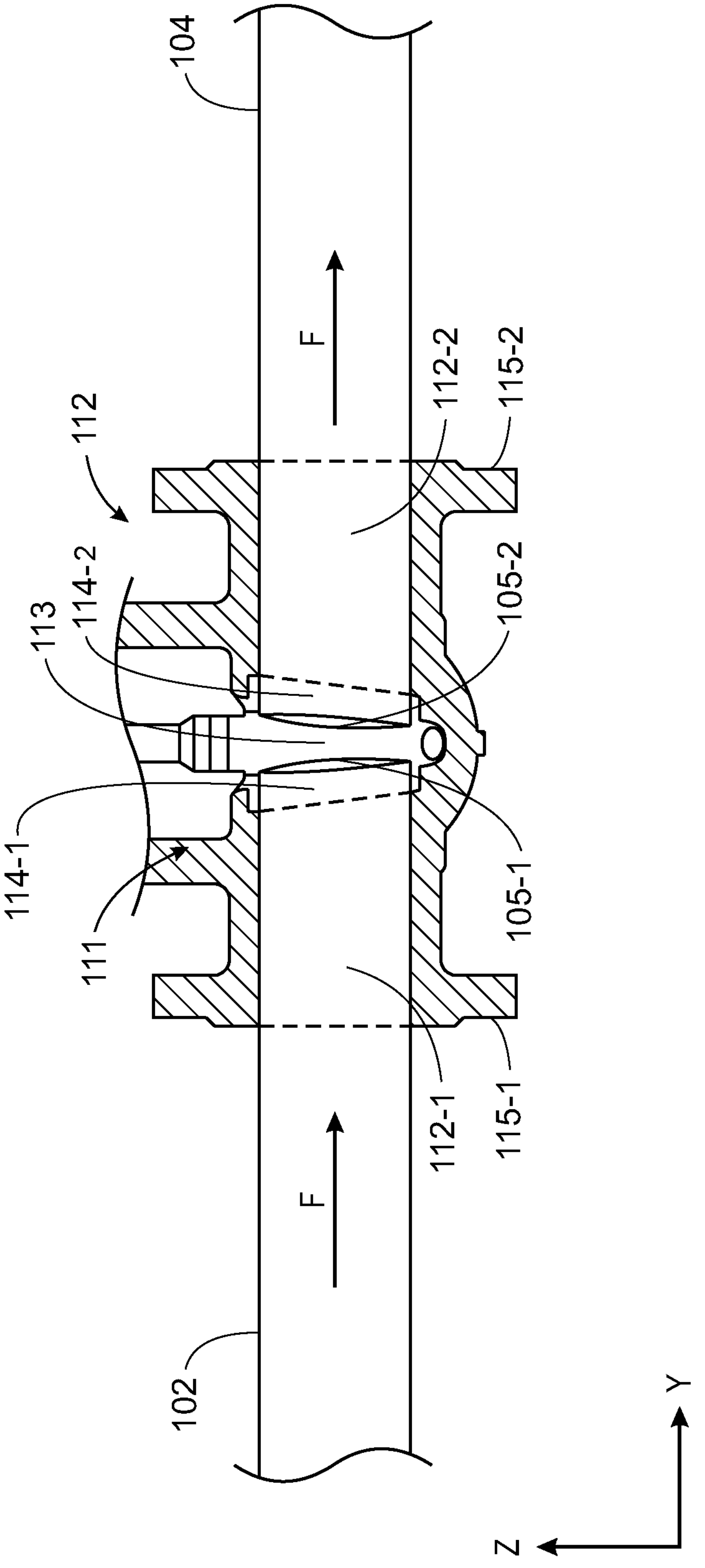
FIG. 2 illustrates a cross-sectional view of a lower body of a gate valve of the valve system of FIGS. 1A-1C in a Y-Z plane.
Figure 3:
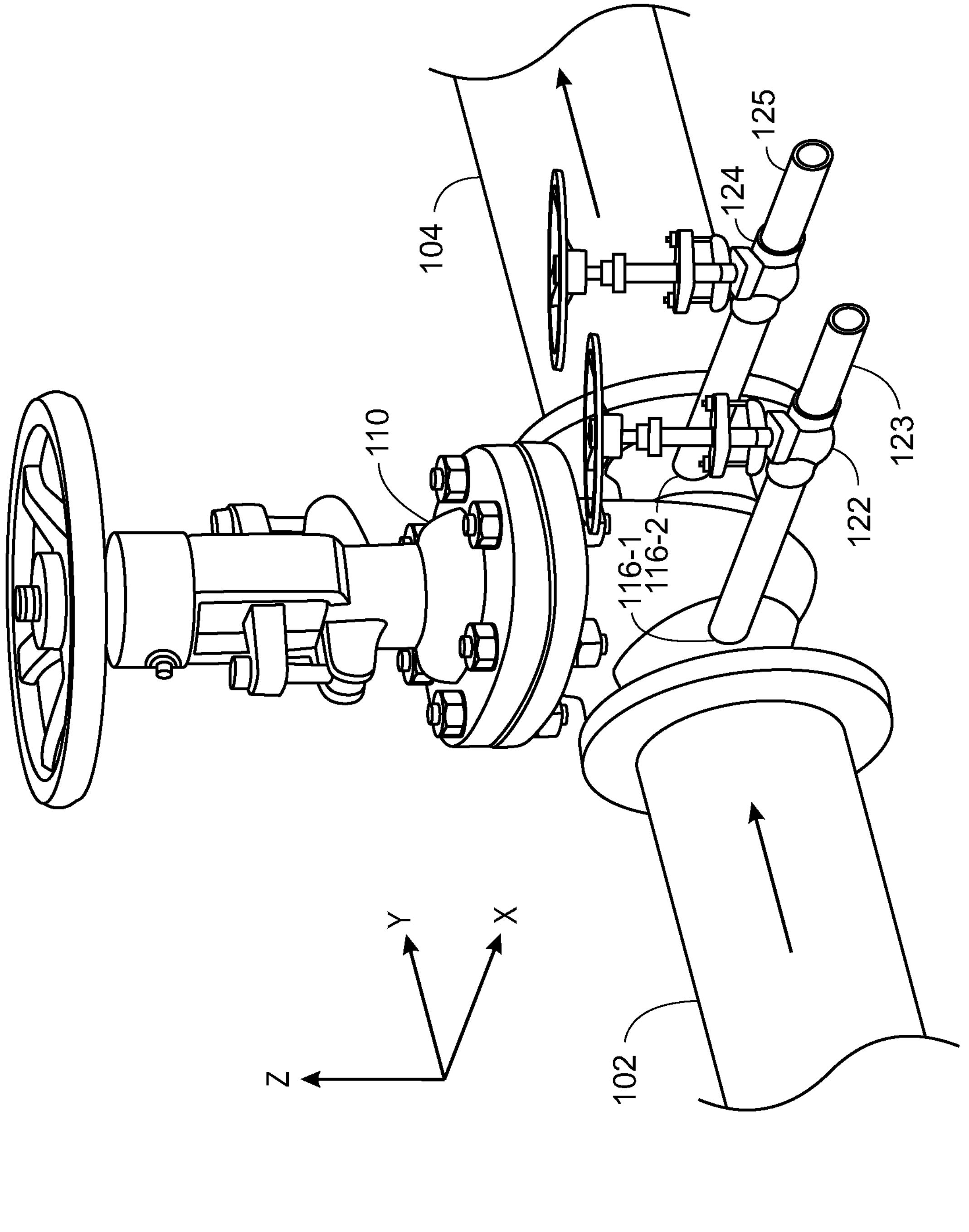
FIG. 3 illustrates an isometric view of a part of the valve system of FIGS. 1A-1C.
Figure 4:
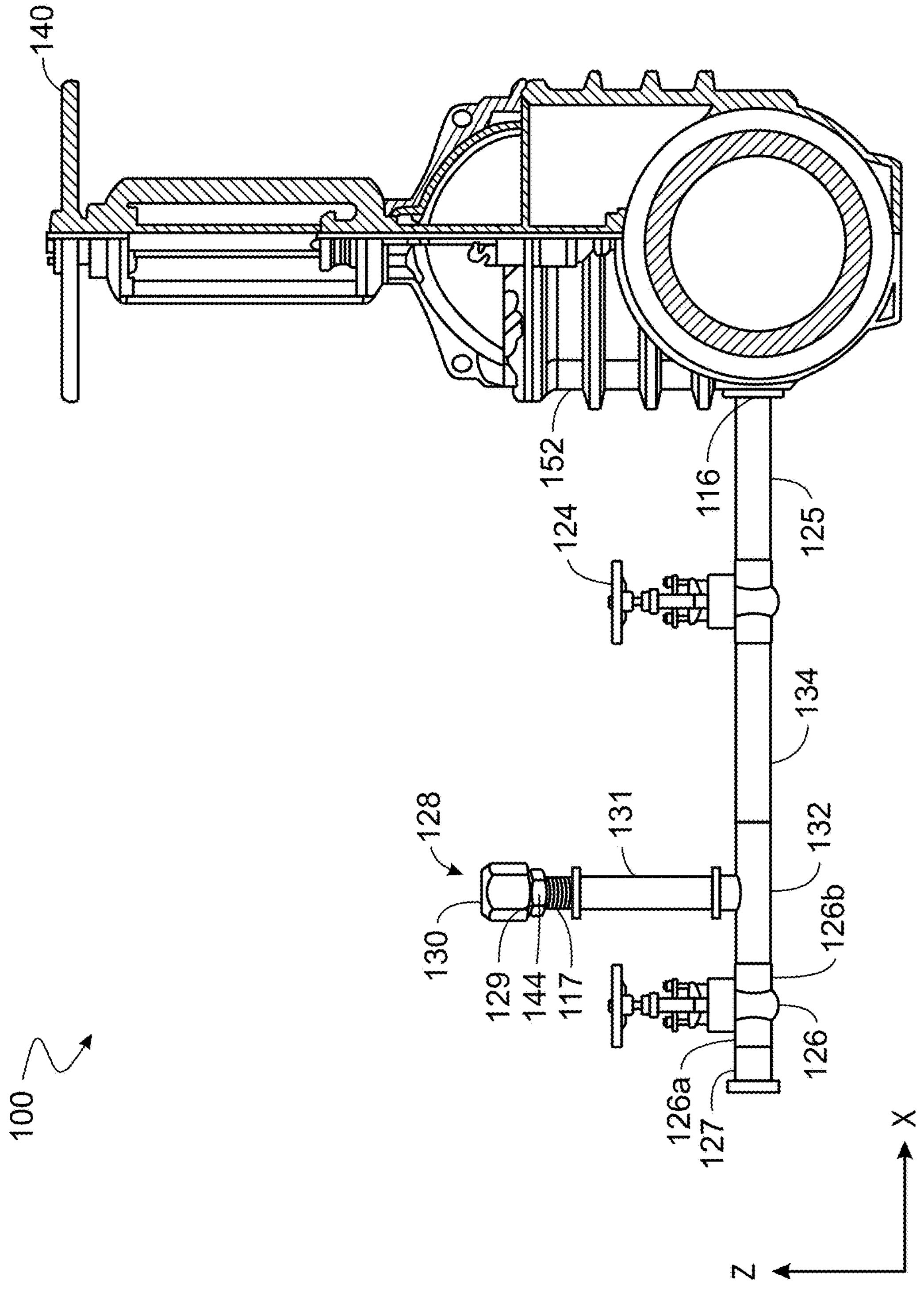
FIG. 4 illustrates a side view of the valve system of FIGS. 1A-1C in an X-Z plane.
Figure 5:
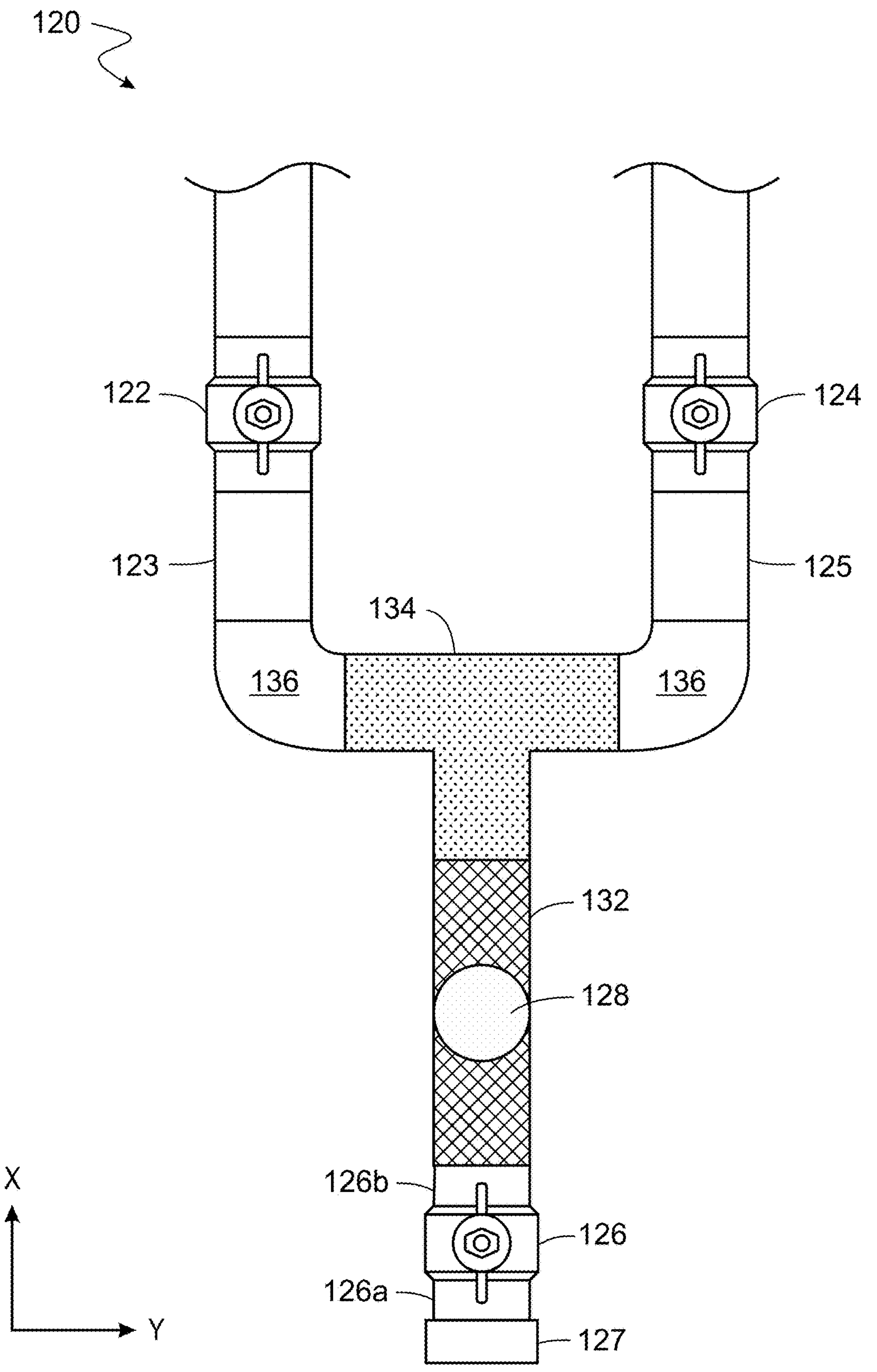
FIG. 5 illustrates a side view of the valve system of FIGS. 1A-1C in an X-Y plane.

The first portion 1 in FIG. 1A is viewed from X-Z plane, the second portion 2 in FIG. 1B viewed from X-Y plane, and the third portion 3 in FIG. 1C viewed from Y-Z plane. FIG. 2 illustrates a cross-sectional view of a lower body of a gate valve of the valve system of FIGS. 1A-1C in Y-Z plane. FIG. 3 illustrates an isometric view of a part of the valve system 100. FIG. 4 illustrates an X-Z plane view of the valve system 100. FIG. 5 illustrates a side view of the valve system 100 in the X-Y plane. For ease of description, reference will be made to FIGS. 1A-5 when describing the structure of the valve system 100.

Referring to FIGS. 1A-2, the valve system 100 includes a gate valve 110. In some implementations, the gate valve 110 is a wedge gate valve. A wedge gate valve can be a type of gate valve that uses a wedge-shaped gate (or called disc) to control the flow of the fluid. The wedge-shaped gate (e.g., gate 113 of FIG. 2) can move up and down to open or close the flow passage within the valve.

The gate valve 110 includes a lower body 112 configured to be disposed between and fluidly coupled to a first pipe 102 and a second pipe 104. The lower body 110 has a first tubular body 112-1 with a first flange 115-1 (see FIG. 2), and a second tubular body 112-2 with a second flange 115-2. The first flange 115-1 is connected to the first pipe 102 and the second flange 115-2 is connected to the second pipe 104. The pipes 102, 104 (and the gate valve 110) can direct fluid "F" in both directions. For example, when the fluid "F" flows from left to right, as shown in FIGS. 1A-2, the first pipe 102 is upstream of the lower body 112 and the second pipe 104 is downstream of the lower body 112. If the fluid "F" flows in the opposite direction, the first pipe 102 is downstream of the lower body 112 and the second pipe 104 is upstream of the lower body 112.

As shown in FIG. 2, the lower body 112 has a housing 111 that houses the gate 113 (e.g., wedge gate, wedge disc). The gate 113 can have a wedge shape and be made of materials such as stainless steel. The wedge-shape gate 113 can have an angle from 3° to 5°. The gate 113 can have two side surfaces 105-1, 105-2 opposed to each other and configured to be pressed respectively against sealing seats 114-1, 114-2 inside the lower body 112 when the gate 113 is moved downward.

The lower body 112 includes a first sealing seat 114-1 and a second sealing seat 114-2 (also called valve seat in some cases). The sealing seats can be seat rings. The seat rings can be threaded, welded or press-fitted into the housing 111. Alternatively, the seat rings can be an integral part of the housing 111. The sealing seats 114 can be angled to match the gate 113. The first sealing seat 114-1 can be connected to the first tubular body 112-1, while the second sealing seat can be connected to the second tubular body 112-2. In some examples, the first sealing seat 114-1 can contact the first side surface 105-1 of the gate 113 to form a first sealing surface, while the second sealing seat 114-2 can contact the second side surface 105-2 of the gate 113 to form a second sealing surface. To close the gate valve 110, the gate 113 can move downward, and its side surface 105-1, 105-2 can respectively contact the sealing seats 114-1, 114-2 to form tight, leak-proof seals. This can ensure fluid isolation and prevent leakage.

Returning to FIGS. 1A-1C, the lower body 112 defines a first through-hole 116-1 and a second through-hole 116-2 on a same side of the lower body 112. The first and second through-holes 116-1, 116-2 can extend through a thickness of one side of the housing 111, allowing the fluid inside the gate valve 110 to be bled or allowing sealant to be introduced into the gate valve 110. As shown, in some examples, both first and second through-holes 116-1, 116-2 can be on a front side 107 of the lower body 112 of the gate valve 110, and they do not extend to the rear side of the lower body 112. In the example flow direction shown in FIGS. 1A-1C, the first through-hole 116-1 can be upstream of the first sealing seat 114-1, and the second through-hole 116-2 can be downstream of the second sealing seat 114-2. The first through-hole 116-1 can be between the first flange 115-1 and the first sealing seat 114-1, while the second through-hole 116-2 can be between the second sealing seat 114-2 and the second flange 115-2. The first through-hole 116-1 and the second through-hole 116-2 may be individually or collectively referred to as through-hole 116 in the present disclosure.

The valve system 100 further includes a side valve assembly 120 that is attached to the lower body 112 of the gate valve 110. In some implementations, the side valve assembly 120 includes a first valve 122, a second valve 124, a third valve 126, an injection fitting 128, a first tee pipe fitting 132, a second tee pipe fitting 134, and multiple side pipes fluidly interconnecting different components of the side valve assembly 120.

Referring now to FIG. 3, the first valve 122 is configured to be fluidly coupled to the first through-hole 116-1 of the lower body 112, and the second valve 124 is configured to be fluidly coupled to the second through-hole 116-2 of the lower body 112. In some implementations, each of the first and second valves 122, 124 is configured to be fluidly coupled to a respective side pipe. For example, the first valve 122 can be fluidly coupled to a first side pipe 123, while the second valve 124 can be fluidly coupled to a second side pipe 125. The first and second side pipes 123, 125 can be cold tapped or threaded into the same side of the lower body 112 of the gate valve 110. In some implementations, a diameter of each side pipe is between 12.7 mm and 50.8 mm (0.5 and 2 inches). For example, the diameter of each side pipe can be about 25.4 mm (1 inch).

In some implementations, the first and/or second valves 122, 124 can be block valves. Examples of block valves include, without limitation to, gate vales, ball vales, globe vales, plug valves, or butterfly valves. In some examples, the first valve 122 can be a 4-inch gate valve and the second valve 124 can also be a 4-inch gate valve. The first and second gate valves 122, 124 can be American Petroleum Institute (API) 602 gate valves.

The first and second valves 122, 124 can operate independently. When the first and/or second valves 122, 124 are open, the gate valve 110 can be drained into the side pipes 123, 125, or a sealing fluid can be flowed into the lower body 112 of the gate valve 110. For example, when the first valve 122 is opened for bleeding the gate valve 110 or introducing sealing fluid into the gate valve 110, the second valve 124 can be either opened or closed. If the second valve 124 is also opened, both valves 122, 124 can be used for bleeding the gate valve 110 or introducing sealing fluid into the gate valve 110. Similarly, when the second valve 124 is opened for bleeding the gate valve 110 or introducing sealing fluid into the gate valve 110, the first valve 122 can be either opened or closed. Having two valves can provide redundancy: if one valve becomes defective, the second valve can ensure that the side valve assembly 120 can still function without disruption.

In addition, as described with further details below, as the second valve 124 can be downstream of the first and second sealing seats 114-1, 114-2, the second valve 124 can be used as a check port to check the isolation of the gate valve 110.

For example, when the second valve 124 is opened for isolation check, the first valve 122 can be closed.

Returning to FIGS. 1A-1C, the injection fitting 128 can be configured to be fluidly coupled to the lower body 112 of the gate valve 110 through at least one of the first valve 122 or the second valve 124. The injection fitting 128 can be coupled to the first and second valves 122, 124 through two tee pipe fittings (e.g., the first tee pipe fitting 132, the second tee pipe fitting 134). Each of the tee pipe fittings can include a main passage having two ports and a branch passage fluidly connected to the main passage. The branch passage can be perpendicular to the main passage to form a T shape. As illustrated in FIGS. 1A-1C, the injection fitting 128 can be fluidly coupled to the branch passage of the first tee pipe fitting 132 through a third pipe 131 that extends perpendicularly to the main passage of the first tee pipe fitting 132. A diameter of the third pipe can be between 12.7 mm and 50.8 mm (0.5 and 2 inches). The first tee pipe fitting 132 can be fluidly coupled to the second tee pipe fitting 134 by connecting a first port of the main passage of first tee pipe fitting 132 to a branch passage of the second tee pipe fitting 134. The two ports of a main passage of the second tee pipe fitting 134 can be respectively coupled to the first and second valves 122, 124 through first and second side pipes 123, 125. For example, a first port of the main passage of the second tee pipe fitting 134 can be fluidly coupled to the first side pipe 123, while a second port of the main passage of the second tee pipe fitting 134 can be fluidly coupled to the second side pipe 125. In some implementations, two elbow pipes 136 can be used to connect the first and second side pipes 123, 125 to the second tee pipe fitting 134. The two elbow pipes 136 can be configured to change the fluid direction by about 90 degrees. Different components of the side valve assembly 120 can be interconnected using threads, cold-tapped pipes, welded connection, compression/push-fit, or any other suitable methods.

With at least one of the first valve 122 or the second valve 124 opened, the injection fitting 128 can receive a sealing fluid to be flowed to the lower body 112 of the gate valve 110 to seal at least one of the first sealing seat 114-1 or the second sealing seat 114-2. For example, as described with further details below in reference to FIG. 6, the sealing fluid can flow downward from the injection fitting 128 to the first through-hole 116-1 to seal the first sealing seat 114-1, and/or to the second through-hole 116-2 to seal the second sealing seat 114-2.

In some implementations, injection fitting 128 includes an injection port 129 configured to be coupled to an injection pump and/or a hose, and to receive the sealing fluid from the injection pump and/or the hose. For example, referring now to FIG. 4, the injection fitting 128 can have a threaded sleeve 117 (e.g., with a hollower body) with two threads (one of them threaded into a third pipe 131) and a polygonal surface 144. The polygonal surface 144 can allow a tool to impart torque on the sleeve 117 to thread the sleeve 117 into the third pipe 131. The injection fitting 128 can also have a threaded head 130 configured to be threaded into the threaded sleeve 117. The threaded sleeve 117 can define a fluid conduit (that can optionally have a one-way valve) that, when the threaded head 130 is slightly unscrewed, is in fluid communication with the injection pump through the injection port 129 of the injection fitting 128.

The injection port 129 of the injection fitting 128 can be configured to be oriented in an upward direction during sealant injection. For example, the injection fitting 128 can extend along a vertical axis of the gate valve (e.g., aligning with the movement direction of the gate 113), rather than projecting perpendicularly from the front side 152 of the gate valve 110. While the valve system 100 is used for sealant injection or bleeding, the front side 152 of the gate valve 110 may be positioned toward an operator for access to the side valve assembly 120. Orienting the injection fitting parallel to the vertical axis of the gate valve 110 can help direct any released gas or liquid (e.g., hydrocarbon release) away from operators, rather than toward them. This can reduce the operator's exposure to potential leaks or sprays during connection or disconnection of the injection pump and/or a hose, thereby enhancing safety.

With continued reference to FIG. 4, in some implementations, during sealant injection, the injection port 129 of the injection fitting 128 is positioned at a level above the first and second through-holes 116 of the lower body 112 along a vertical direction (e.g., Z direction). For example, during sealant injection, the first and second side pipes 123, 125 can be projecting perpendicularly from the front side 152 of the gate valve 110 and arranged horizontally along X direction, while the injection fitting 128 can extend perpendicularly to the first and second side pipes 123, 125 and arranged vertically along Z direction. As a result, the injection port 129 of the injection fitting 128 can be positioned at a higher level compared to the through-holes 116 along Z direction. This arrangement may facilitate injection of sealing fluid (e.g., sealant) to the gate valve 110 by utilizing gravity for improved flow efficiency. It is to be noted that FIG. 4 is a side view of the valve system 100 in X-Z plane. From this view, the first and second valves 122, 124, as well as the first and second side pipes 123, 125, may appear overlapped. Therefore, although only one valve and one side pipe are depicted in FIG. 4, the valve system 100 includes both first and second valves 122, 124 and both side pipes 123, 125, as described above.

In some implementations, the injection fitting 128 is positioned between the third valve 126 and the gate valve 110 (e.g., along X direction). The injection fitting 128 can be a seat injection fitting, a high-pressure grease fitting, a packing injection fitting, straight injection fitting, tee injection fitting, elbow injection fitting, ball valve injection fitting, check valve injection fitting, or any other suitable fittings. The injection fitting 128 can have a single injection port or multiple injection ports.

Referring now to FIGS. 1A-1C, 4 and 5, in some implementations, the side valve assembly 120 includes a third valve 126 configured to be fluidly coupled to the lower body 112 of the gate valve 110 through at least one of the first valve 122 or the second valve 124. A threaded plug 127 can be configured to be removably coupled to an outlet **126*a* of the third valve 126. The threaded plug 127 can be removed from the outlet 126*a* of the third valve 126 to open the third valve 126 to an ambient environment. When the third valve 126 and at least one of the first valve 122 or the second valve 124 are opened, the lower body 112 of the gate valve 110 can be drained through the third valve 126, as described with further details below in reference to FIG. 7**.

In some implementations, during bleeding of the gate valve 110, the third valve 126 is positioned at a level same as or lower than the first and second through-holes 116 of the lower body 112 along a vertical direction (e.g., Z direction). For example, as illustrated in FIG. 4, the third valve 126 can be positioned at a same or substantially similar level as the through-holes 116. An inlet **126*b* of the third valve 126 can be coupled to a port of the main passage of the first tee pipe fitting 132 that extends horizontally (e.g., along X direction) to direct a draining fluid from the lower body 112 of the gate valve 110** to flow horizontally (e.g., along X direction)

through the third valve 126 into the ambient environment. In some implementations, the draining fluid is liquid. Flowing the liquid horizontally or downwardly may help prevent the accumulation of stagnant fluid, thereby reducing the risk of damage to the third valve 126 caused by prolonged exposure to the stagnant fluid. Accumulated liquid inside the side valve assembly 120 may also require additional pressure to drain it completely. By positioning the third valve 126 at a level same as or lower than the first and second through-holes 116 of the lower body 112 along Z direction, the liquid can be more effectively drained under gravity. In some other implementations, the draining fluid from the gate valve 110 is gas.

Figure 6:
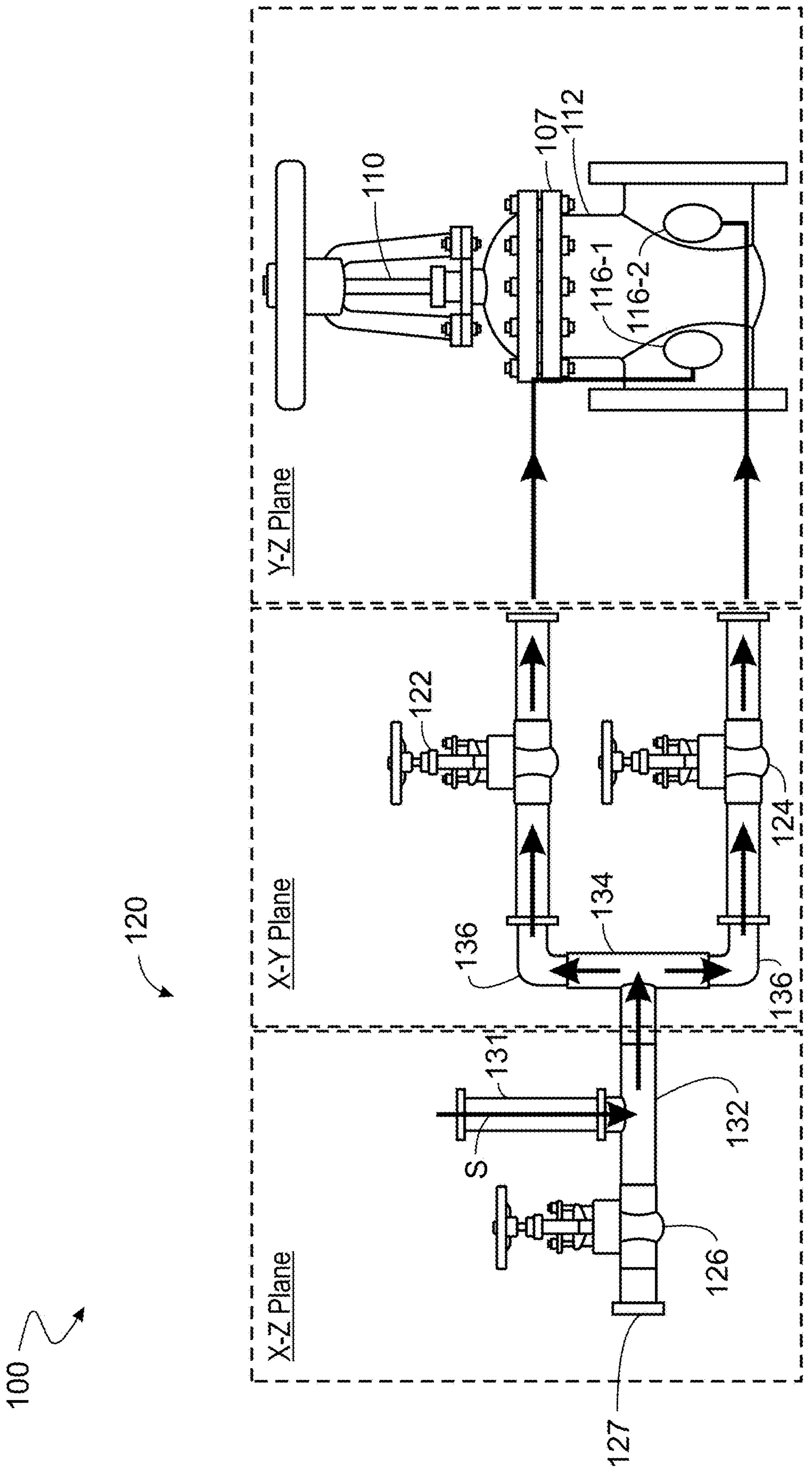
FIG. 6 illustrates a schematic view of the valve system of FIGS. 1A-1C during injection of sealing fluid into the gate valve.

FIG. 6 illustrates a schematic view of the valve system 100 of FIGS. 1A-1C during injection of sealing fluid. As noted above, when the gate valve 110 is internally leaking, the injection fitting 128 can receive a sealing fluid (e.g., a sealant "S" in FIG. 6, or grease) to be flowed toward and into the gate valve 110 to seal at least a portion of the gate valve 110 (e.g., a first and/or second sealing seats 114). The sealant can temporarily stop the leakage into the second pipe 104 to allow the gate valve 110 to be in-line repaired or serviced. For example, once the sealant is injected and leakage is controlled, the gate valve 110 can be opened (e.g., from top) to repair the gate valve 110. The grease can help prevent damage to the sealing seats 114 of the gate valve 110 by lubricating the sealing seats 114. In some cases, the sealant allows the gate valve 110 to be removed to perform any major repair for the sealing seats 114 or to replace all or parts of the gate valve 110.

To inject a sealant into the gate valve 110, the injection fitting 128 and at least one of the first valve 122 or the second valve 124 can be used to open at least one fluid pathway that extends from the injection fitting 128 to the lower body 112 of the gate valve 110. In an example, the injection fitting 128 and the first valve 122 can be opened, while the second valve 124 can be closed, to open a first fluid pathway from the injection fitting 128 to the first through-hole 116-1. In another example, the injection fitting 128 and the second valve 124 can be opened with the first valve 122 being closed to open a second fluid pathway from the injection fitting 128 to the second through-hole 116-2. In yet another example, the injection fitting 128 and both first and second valves 122, 124 can be opened to open both first and second fluid pathways, e.g., one from the injection fitting 128 to the first through-hole 116-1, while the other one from the injection fitting 128 to the second through-hole 116-2.

In some implementations, the side valve assembly 120 is configured to inject the sealant into the lower body 112 of the gate valve 110 through the first through-hole 116-1 to seal the first sealing seat 114-1, and/or through the second through-hole 116-2 to seal the second sealing seat 114-2. In some implementations, the side valve assembly 120 is configured to inject the sealant into the lower body 112 through one of the through-holes 116 to seal both sealing seats 114.

As noted above, the injection fitting 128 can include a head 130. When the injection fitting 128 is not in use, the head 130 can be threaded in (as shown in FIGS. 1A-1C) to close the injection port 129. To inject the sealant "S" or grease, the head 130 can be threaded out to open the fluid pathway. A pump, a hose, or similar device can be connected to the head 130 to flow the sealant "S" through the injection port 129 into the third pipe 131 and to the first and second valves 122, 124. In some implementations, the sealant "S" can be flowed against a pressure of between 100 to 200 pounds per square inch (psi) more than a pressure at the gate valve 110.

Figure 7:
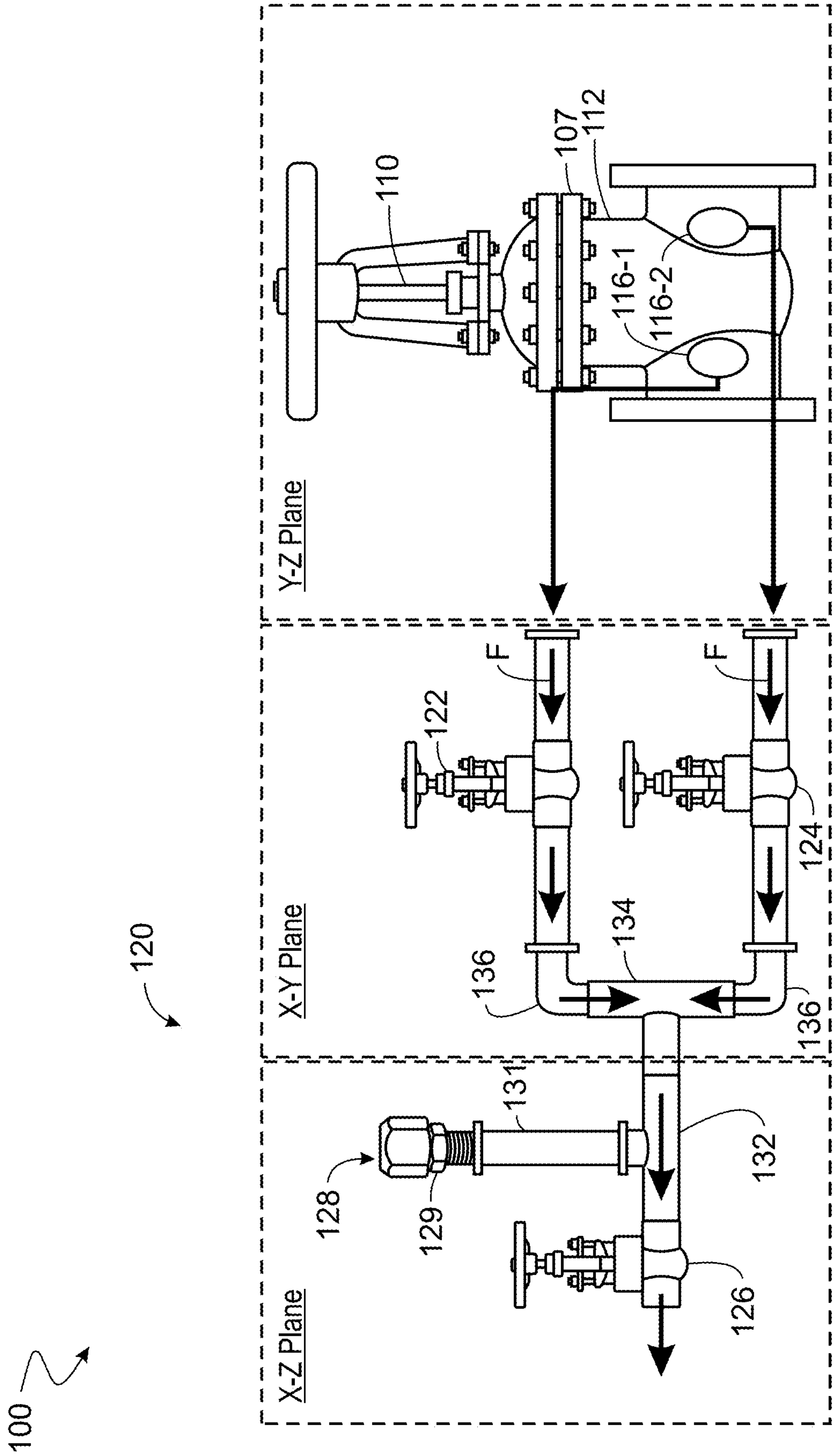
FIG. 7 illustrates a schematic view of the valve system of FIGS. 1A-1C during a draining process of the gate valve.

FIG. 7 illustrates a schematic view of the valve system 100 of FIGS. 1A-1C during a draining process of a gate valve. As noted above, the side valve assembly 120 allows fluid to be bled out or drained from the gate valve 110. To drain the lower body 112 of the gate valve 110, the threaded plug 127 can be removed (e.g., unscrewed) from the third valve 126 to open the outlet **126*a* of the third valve 126 to the ambient environment (e.g., the external environment at atmospheric pressure). Then, at least one of the first valve 122 or second valve 124 can be opened to form a fluid pathway that extends from the gate valve 110 to the outlet 126*a*. With the first and second valves 122, 124 opened, the fluid "F" in the lower body 112 of the gate valve 110 can flow past at least one of the first and second valves 122, 124, the second tee pipe fitting 134, the first tee pipe fitting 132, and the third valve 126 to exit the side valve assembly 120 through the outlet 126*a* of the third valve 126. As noted above, the fluid "F" can flow horizontally or downwardly along the fluid pathway, preventing the accumulation of stagnant fluid in dead legs within the side valve assembly 120. In cases where some fluid remains in the lower body 112 (e.g., between the sealing seats 114), a pump or similar device can be attached to the outlet 126*a*** to suck any remaining fluid and completely drain the volume between the sealing seats.

The valve system 100 described herein can form a double block and bleed (DBB) valve for bleeding the gate valve 110. For example, at least one of the first valve 122 or the second valve 124 can be the first block, and the third valve 126 can be the second block. In some implementations, to bleed the gate valve 110, the first block (e.g., first valve 122 and/or the second valve 124) can be first opened. Next, the threaded plug 127 is removed. Finally, the second block (e.g., the third valve 126) is opened to allow draining of the fluid. This DBB valve has only one gate valve 110 in the main line and thus only one valve actuator 140 (see FIG. 4) or one hand wheel (as opposed to other DBB valves that have two valves/actuators and a bleed valve disposed in between the two), allowing for compact configuration and reducing cost.

Figure 8:
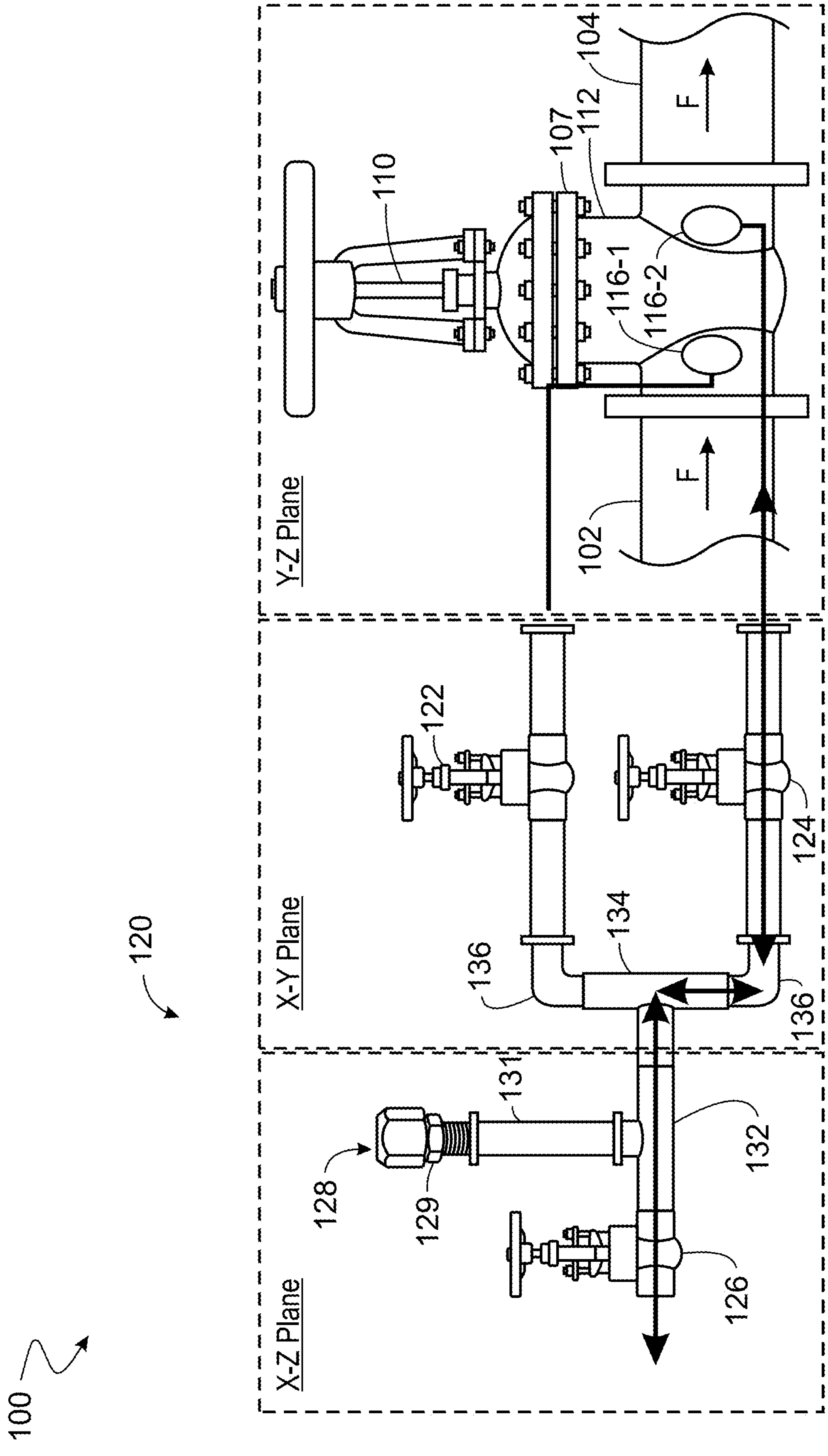
FIG. 8 illustrates a schematic view of the valve system of FIGS. 1A-1C during insolation checking of the gate valve.

FIG. 8 illustrates a schematic view of the valve system 100 of FIGS. 1A-1C during insolation checking of the gate valve 110. To check the isolation of the gate valve 110, the gate valve 110 can be closed. In some examples, the gate valve 110 is a wedge gate valve, and the wedge gate valve can be closed by moving the gate 113 (see FIG. 2) downward into the lower body 112 of the gate valve 110 and between two sealing seats 114. The gate 113 can be lowered manually (e.g., by a handle or handwheel), or automatically (e.g., by the valve actuator 140 of FIG. 4). The first valve 122 in the side valve assembly 120 can be closed, while the second and third valves 124, 126 can be opened to form a pathway between the third valve 126 and the second through-hole 116-2 that is downstream of the sealing seats 114 of the gate valve 110. The second port 116-2 can then be used as a check port to verify whether the gate valve 110 is properly isolating fluid. In some examples, isolation checking can involve pressure testing and/or flow verification. During pressure testing, a pressure gauge can be coupled to the third valve 126 and configured to measure the pressure downstream of the second sealing seat 114-2. If the gate valve 110 is properly isolated, there may not be pressure on the downstream side when the gate valve 110 is closed. During flow verification, the third valve 126 can be opened to verify if any fluid comes out. If no fluid comes out, it may confirm that the gate valve 110 is isolating the flow properly.

Figure 9:
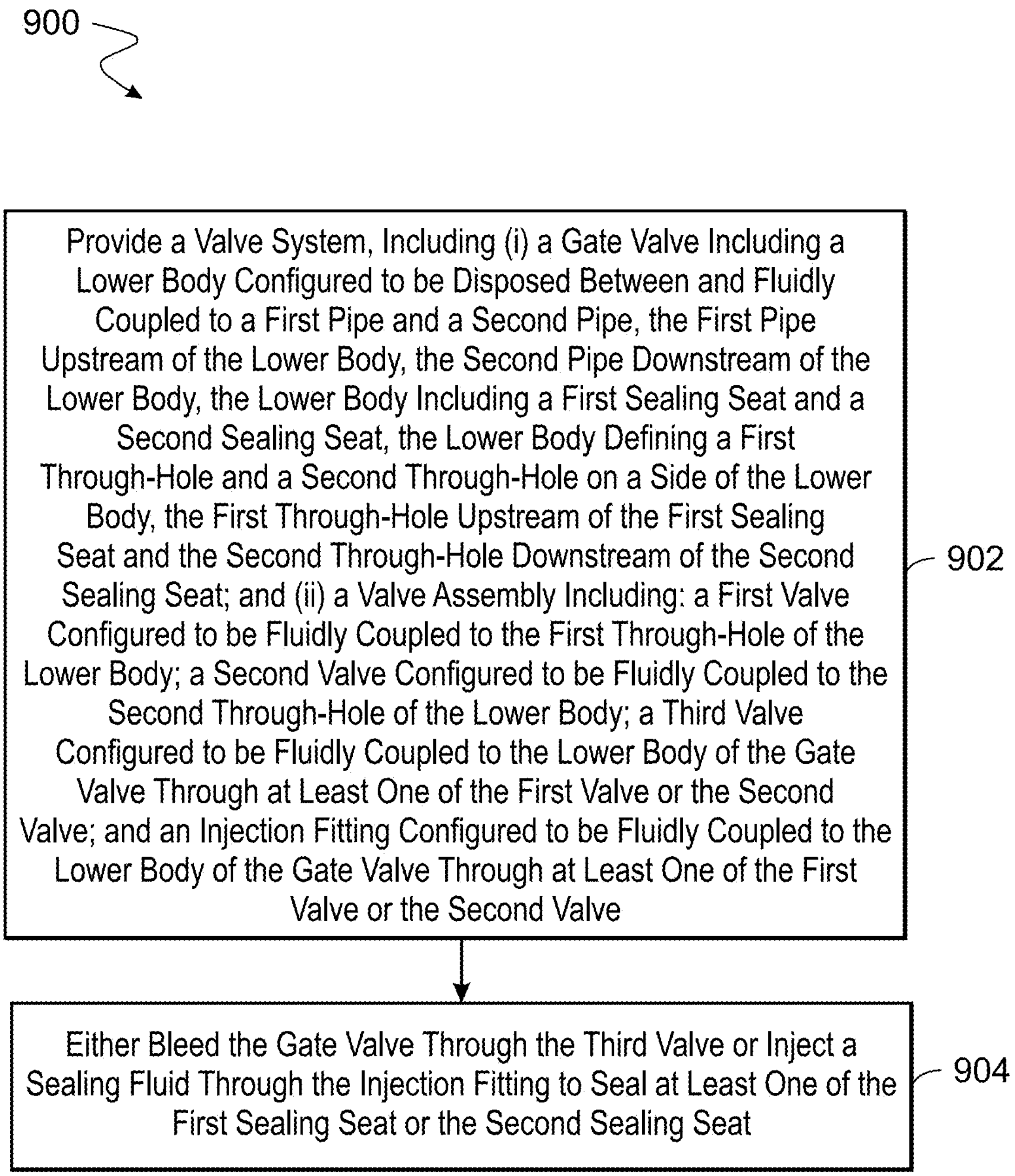
FIG. 9 is a flow chart of a process of an example method to operate a valve system.

FIG. 9 is a flow chart of a process of an example method 900 to operate a valve system. The valve system can be, e.g., the valve system 100 of FIGS. 1A-8. At step 902, a valve system is provided. The valve system can include a gate valve that includes a lower body configured to be disposed between and fluidly coupled to a first pipe and a second pipe. The first pipe is upstream of the lower body. The second pipe is downstream of the lower body. The lower body includes a first sealing seat and a second sealing seat. The lower body defines a first through-hole and a second through-hole on a same side of the lower body. The first through-hole is upstream of the first sealing seat and the second through-hole is downstream of the second sealing seat. The valve system further includes a side valve assembly. The side valve assembly includes a first valve configured to be fluidly coupled to the first through-hole of the lower body; a second valve configured to be fluidly coupled to the second through-hole of the lower body; a third valve configured to be fluidly coupled to the lower body of the gate valve through at least one of the first valve or the second valve; and an injection fitting configured to be fluidly coupled to the lower body of the gate valve through at least one of the first valve or the second valve. The gate valve can be, e.g., the gate valve 110 of FIGS. 1A-8. The lower body can be, e.g., the lower body 112 of FIGS. 1A-8. The first pipe can be, e.g., the first pipe 102 of FIGS. 1A-4. The second pipe can be, e.g., the second pipe 104 of FIGS. 1A-4. The first sealing seat can be, e.g., the first sealing seat 114-1 of FIG. 2. The second sealing seat can be, e.g., the second sealing seat 114-2 of FIG. 2. The side valve assembly can be, e.g., the side valve assembly 120 of FIGS. 1A-8. The first valve can be, e.g., the first valve 122 of FIGS. 1A-8. The second valve can be, e.g., the second valve 124 of FIGS. 1A-8. The third valve can be, e.g., the third valve 126 of FIGS. 1A-8. The injection fitting can be, e.g., the injection fitting 128 of FIGS. 1A-8.

At step 904, the method includes either bleeding the gate valve through the third valve or injecting a sealing fluid through the injection fitting to seal at least one of the first sealing seat or the second sealing seat, as described above in reference to FIGS. 6 and 7.

In some implementations, providing the valve system includes orientating an injection port of the injection fitting in an upward direction, the injection port of the injection fitting configured to be fluidly coupled to an injection pump; and orientating a drain port of the third valve in a horizontal direction, the drain port of the third valve configured to be removably coupled to a threaded plug that is configured to be removed from the drain port of the third valve to open the third valve to an ambient environment, as described above in reference to FIGS. 6 and 7.

In some implementations, wherein the injection fitting is positioned between the third valve and the gate valve, as shown in FIGS. 1A-1C.

In some implementations, the method 900 includes checking an isolation of the gate valve through the second valve. In some implementations, checking the isolation of the gate valve through the second valve includes: closing the gate valve; closing the first valve; and opening the second and third valves to check at least one of a pressure or a fluid leakage, as described above in reference to FIG. 8.

In some implementations, bleeding the gate valve through the third valve includes: opening at least one of the first valve or the second valve; removing a threaded plug that is configured to be removably coupled to a drain port of the third valve to open the drain port of the third valve to an ambient environment; opening the third valve; and directing a draining fluid from the lower body of the gate valve to flow horizontally or downward into the ambient environment, as described above in reference to FIG. 7.

In some implementations, injecting the sealing fluid through the injection fitting includes: closing the third valve; opening at least one of the first valve or the second valve; and directing the sealing fluid to flow downward from an injection portion of the injection fitting into the lower body of the gate valve, as described above in reference to FIG. 6.

The valve system 100 can be implemented in various hydrocarbon processing and extraction environment. In some implementations, the valve system 100 is used in a processing facility. For example, the valve system 100 can be integrated into pipelines that transport hydrocarbon streams during refining, separation, or chemical processing. The valve system 100 in a processing facility can be used to regulate the hydrocarbon streams. In some examples, the hydrocarbon streams can flow from the first pipe 102, passing through the gate valve 110 when it is open, to the second pipe 104 (see FIGS. 1A-1C). The three valves 122, 124, 126 and the injection fitting 128 in the side valve assembly 120 can be closed during this process. To check the isolation of the gate valve 110, the gate valve 110 can be closed by lowering down the gate 113. At this point, the hydrocarbon streams can be blocked by the gate 113. Then, the second valve 124 and the third valve 126 can be opened, while the first valve 122 and the injection fitting 128 remain closed. The second and third valves 124, 126 can be used as a check port to verify if there is any leak inside the gate valve 110. If a leak is detected, the third valve 126 can be closed, and the injection fitting 128 can be opened. At least one of the first and second valve 122, 124 can be opened. The sealant "S" (see FIG. 6) can then be introduced through the injection fitting 128 to flow through opened first and/or second valves 122, 124 to the lower body 112 of the gate valve 110 to seal the first and/or second sealing seat 114. In some examples, before injecting sealant into the gate valve 110, the gate valve 110 needs to be bled to ensure the sealant is applied effectively and that there is no interference from remaining fluid inside the gate valve 110. To bleed the gate valve 110, the injection fitting 128 can be closed, while the third valve 126 can be opened. At least one of the first or second valves 122, 124 can be opened. The fluid can then be drained from the gate valve 110 to an ambient environment (e.g., a pipe or a container connected to the third valve 126) through the opened first and/or second valves 122, 124 and the third valve 126.

Certain aspects of the subject matter described here can be implemented as a valve system. A valve system includes: a gate valve including a lower body configured to be disposed between and fluidly coupled to a first pipe and a second pipe. The first pipe is upstream of the lower body and the second pipe is downstream of the lower body. The lower body includes a first sealing seat and a second sealing seat. The lower body defines a first through-hole and a second through-hole on a side of the lower body. The first through-hole is upstream of the first sealing seat, and the second through-hole is downstream of the second sealing seat. The valve system includes a side valve assembly. The side valve assembly includes: a first valve configured to be fluidly coupled to the first through-hole of the lower body; a second valve configured to be fluidly coupled to the second through-hole of the low body; and an injection fitting configured to be fluidly coupled to the lower body of the gate valve through at least one of the first valve or the second valve. The injection fitting is configured to receive a sealing fluid to be flowed, with at least one of the first valve or the second valve opened, to the lower body of the gate valve to seal at least one of the first sealing seat or the second sealing seat.

An aspect combinable with any other aspect includes the following features. The side valve assembly includes: a third valve configured to be fluidly coupled to the lower body of the gate valve through at least one of the first valve or the second valve; and a threaded plug configured to be removably coupled to an outlet of the third valve. The threaded plug is configured to be removed from an outlet of the third valve to open the third valve to an ambient environment to allow, with the third valve and at least one of the first valve or the second valve opened, draining of the lower body of the gate valve. The injection fitting is positioned between the third valve and the gate valve.

An aspect combinable with any other aspect includes the following features. The third valve is configured to be positioned at a level same as or lower than the first and second through-holes of the lower body along a vertical direction.

An aspect combinable with any other aspect includes the following features. The valve system includes: a first tee pipe fitting and a second tee pipe fitting. A first port of a main passage of the first tee pipe fitting is configured to be fluidly coupled to a branch passage of the second tee pipe fitting, and the first and second valves are configured to be fluidly coupled to two ports of a main passage of the second tee pipe fitting, respectively.

An aspect combinable with any other aspect includes the following features. The third valve is configured to be fluidly coupled to a second port of the main passage of the first tee pipe fitting to allow a draining fluid from the lower body of the gate valve to flow horizontally through (i) at least one of the first valve or the second valve and (ii) the third valve into an ambient environment.

An aspect combinable with any other aspect includes the following features. The draining fluid is liquid.

An aspect combinable with any other aspect includes the following features. The injection fitting is configured to be fluidly coupled to a branch passage of the first tee pipe fitting to allow the sealing fluid to flow downward into the lower body of the gate valve.

An aspect combinable with any other aspect includes the following features. The injection fitting includes an injection port configured to receive the sealing fluid, and the injection port of the injection fitting is configured to be oriented in a movement direction of a gate of the gate valve.

An aspect combinable with any other aspect includes the following features. The injection port of the injection fitting is configured to be positioned at a level above the first and second through-holes of the lower body along a vertical direction.

An aspect combinable with any other aspect includes the following features. Each of the first and second valves is configured to be fluidly coupled to a respective pipe that is cold tapped or threaded into the side of the lower body of the gate valve.

An aspect combinable with any other aspect includes the following features. The gate valve includes a wedge gate valve, the first valve includes a first block valve, the second valve includes a second block valve, and the third valve includes a third block valve. The third block valve and at least one of the first block valve or the second block valve are configured to open to allow draining of the lower body of the wedge gate valve such that the valve system forms a double block and bleed (DBB) valve.

Certain aspects of the subject matter described here can be implemented as a method. The method includes providing a valve system. The valve system includes a gate valve including a lower body configured to be disposed between and fluidly coupled to a first pipe and a second pipe. The first pipe is upstream of the lower body. The second pipe is downstream of the lower body. The lower body includes a first sealing seat and a second sealing seat. The lower body defines a first through-hole and a second through-hole on a same side of the lower body. The first through-hole is upstream of the first sealing seat, and the second through-hole is downstream of the second sealing seat. The valve system also includes a side valve assembly including: a first valve configured to be fluidly coupled to the first through-hole of the lower body; a second valve configured to be fluidly coupled to the second through-hole of the lower body; a third valve configured to be fluidly coupled to the lower body of the gate valve through at least one of the first valve or the second valve; and an injection fitting configured to be fluidly coupled to the lower body of the gate valve through at least one of the first valve or the second valve. The method includes either bleeding the gate valve through the third valve or injecting a sealing fluid through the injection fitting to seal at least one of the first sealing seat or the second sealing seat.

An aspect combinable with any other aspect includes the following features. Providing the valve system includes: orienting an injection port of the injection fitting in an upward direction, the injection port of the injection fitting configured to be fluidly coupled to an injection pump; and orienting an outlet of the third valve in a horizontal direction, the outlet of the third valve configured to be removably coupled to a threaded plug that is configured to be removed from the outlet of the third valve to open the third valve to an ambient environment.

An aspect combinable with any other aspect includes the following features. The injection fitting is positioned between the third valve and the gate valve.

An aspect combinable with any other aspect includes the following features. The method includes checking an isolation of the gate valve through the second valve.

An aspect combinable with any other aspect includes the following features. Checking the isolation of the gate valve through the second valve includes: closing the gate valve; closing the first valve; and opening the second and third valves to check at least one of a pressure or a fluid leakage.

An aspect combinable with any other aspect includes the following features. Bleeding the gate valve through the third valve includes: opening at least one of the first valve or the second valve; removing a threaded plug that is configured to be removably coupled to an outlet of the third valve to open the outlet of the third valve to an ambient environment; opening the third valve; and directing a draining fluid from the lower body of the gate valve to flow horizontally or downward into the ambient environment.

An aspect combinable with any other aspect includes the following features. Injecting the sealing fluid through the injection fitting includes: closing the third valve; opening at least one of the first valve or the second valve; and directing the sealing fluid to flow downward from an injection portion of the injection fitting into the lower body of the gate valve.

Certain aspects of the subject matter described here can be implemented as a valve system. The valve system includes a gate valve including a lower body configured to be disposed between and fluidly coupled to a first pipe and a second pipe. The first pipe is upstream of the lower body, and the second pipe is downstream of the lower body. The lower body includes a first sealing seat and a second sealing seat. The lower body defines a first through-hole and a second through-hole on a same side of the lower body. The first through-hole is upstream of the first sealing seat, and the second through-hole is downstream of the second sealing seat. The valve system includes a side valve assembly. The side valve assembly includes a first valve configured to be fluidly coupled to the first through-hole of the lower body; a second valve configured to be fluidly coupled to the second through-hole of the low body; a third valve configured to be fluidly coupled to the lower body of the gate valve through at least one of the first valve or the second valve; and a threaded plug configured to be removably coupled to an outlet of the third valve. The threaded plug is configured to be removed from an outlet of the third valve to open the third valve to an ambient environment to allow, with the third valve and at least one of the first valve or the second valve opened, draining of the lower body of the gate valve.

An aspect combinable with any other aspect includes the following features. The side valve assembly includes: an injection fitting configured to be fluidly coupled to the lower body of the gate valve through at least one of the first valve or the second valve, the injection fitting configured to receive a sealing fluid to be flowed, with at least one of the first valve or the second valve opened, to the lower body of the gate valve to seal at least one of the first sealing seat or the second sealing seat. The injection fitting is positioned between the third valve and the gate valve.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Moreover, aspects described with reference to any figure or any implementation can be combined with aspects described with any other figure or any other implementation.

It is understood that the articles "a," "an," and "the" in this disclosure are intended to mean that there are one or more of the elements in the preceding descriptions. The terms "comprising," "including," and "having" are intended to be inclusive and mean that there may be additional elements other than the listed elements. Additionally, it should be understood that references to "one example" or "an example" of the present disclosure are not intended to be interpreted as excluding the existence of additional examples that also incorporate the recited features. For example, any element described in relation to an example herein may be combinable with any element of any other example described herein. Numbers, percentages, ratios, or other values stated herein are intended to include that value, and also other values that are "about" or "approximately" the stated value, as would be appreciated by one of ordinary skill in the art encompassed by examples of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to examples disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the examples that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The invention claimed is:

1. A valve system, comprising:

a gate valve comprising a lower body configured to be disposed between and fluidly coupled to a first pipe and a second pipe, the first pipe upstream of the lower body and the second pipe downstream of the lower body, wherein the lower body comprises a first sealing seat and a second sealing seat, the lower body defines a first through-hole and a second through-hole on a side of the lower body, the first through-hole is upstream of the first sealing seat, and the second through-hole is downstream of the second sealing seat; and a side valve assembly comprising:

a first valve configured to be fluidly coupled to the first through-hole of the lower body;

a second valve configured to be fluidly coupled to the second through-hole of the low body; and an injection fitting configured to be fluidly coupled to the lower body of the gate valve through at least one of the first valve or the second valve, the injection fitting configured to receive a sealing fluid to be flowed, with at least one of the first valve or the second valve opened, to the lower body of the gate valve to seal at least one of the first sealing seat or the second sealing seat.

2. The valve system of claim 1, wherein the side valve assembly comprises:

a third valve configured to be fluidly coupled to the lower body of the gate valve through at least one of the first valve or the second valve; and a threaded plug configured to be removably coupled to an outlet of the third valve, wherein the threaded plug is configured to be removed from the outlet of the third valve to open the third valve to an ambient environment to allow, with the third valve and at least one of the first valve or the second valve opened, draining of the lower body of the gate valve, and wherein the injection fitting is positioned between the third valve and the gate valve.

3. The valve system of claim 2, wherein the third valve is configured to be positioned at a level same as or lower than the first and second through-holes of the lower body along a vertical direction.

4. The valve system of claim 2, comprising:

a first tee pipe fitting and a second tee pipe fitting, wherein a first port of a main passage of the first tee pipe fitting is configured to be fluidly coupled to a branch passage of the second tee pipe fitting, and wherein the first and second valves are configured to be fluidly coupled to two ports of a main passage of the second tee pipe fitting, respectively.

5. The valve system of claim 4, wherein the third valve is configured to be fluidly coupled to a second port of the main passage of the first tee pipe fitting to allow a draining fluid from the lower body of the gate valve to flow horizontally through (i) at least one of the first valve or the second valve and (ii) the third valve into an ambient environment.

6. The valve system of claim 5, wherein the draining fluid is liquid.

7. The valve system of claim 4, wherein the injection fitting is configured to be fluidly coupled to a branch passage of the first tee pipe fitting to allow the sealing fluid to flow downward into the lower body of the gate valve.

8. The valve system of claim 2, wherein the gate valve comprises a wedge gate valve, the first valve comprises a first block valve, the second valve comprises a second block valve, and the third valve comprises a third block valve, and wherein the third block valve and at least one of the first block valve or the second block valve are configured to open to allow draining of the lower body of the wedge gate valve such that the valve system forms a double block and bleed (DBB) valve.

9. The valve system of claim 1, wherein the injection fitting comprises an injection port configured to receive the sealing fluid, and the injection port of the injection fitting is configured to be oriented in a movement direction of a gate of the gate valve.

10. The valve system of claim 9, wherein the injection port of the injection fitting is configured to be positioned at a level above the first and second through-holes of the lower body along a vertical direction.

11. The valve system of claim 1, wherein each of the first and second valves is configured to be fluidly coupled to a respective pipe that is cold tapped or threaded into the side of the lower body of the gate valve.

12. A method, comprising:

providing a valve system, comprising:

a gate valve comprising a lower body configured to be disposed between and fluidly coupled to a first pipe and a second pipe, the first pipe upstream of the lower body, the second pipe downstream of the lower body, the lower body comprising a first sealing seat and a second sealing seat, the lower body defining a first through-hole and a second through-hole on a same side of the lower body, the first through-hole upstream of the first sealing seat and the second through-hole downstream of the second sealing seat; and a side valve assembly comprising: a first valve configured to be fluidly coupled to the first through-hole of the lower body; a second valve configured to be fluidly coupled to the second through-hole of the lower body; a third valve configured to be fluidly coupled to the lower body of the gate valve through at least one of the first valve or the second valve; and an injection fitting configured to be fluidly coupled to the lower body of the gate valve through at least one of the first valve or the second valve; and either bleeding the gate valve through the third valve or injecting a sealing fluid through the injection fitting to seal at least one of the first sealing seat or the second sealing seat.

13. The method of claim 12, wherein providing the valve system comprises:

orienting an injection port of the injection fitting in an upward direction, the injection port of the injection fitting configured to be fluidly coupled to an injection pump; and orienting an outlet of the third valve in a horizontal direction, the outlet of the third valve configured to be removably coupled to a threaded plug that is configured to be removed from the outlet of the third valve to open the third valve to an ambient environment.

14. The method of claim 12, wherein the injection fitting is positioned between the third valve and the gate valve.

15. The method of claim 12, comprising: checking an isolation of the gate valve through the second valve.

16. The method of claim 15, wherein checking the isolation of the gate valve through the second valve comprises:

closing the gate valve;

closing the first valve; and opening the second and third valves to check at least one of a pressure or a fluid leakage.

17. The method of claim 12, wherein bleeding the gate valve through the third valve comprises:

opening at least one of the first valve or the second valve;

removing a threaded plug that is configured to be removably coupled to an outlet of the third valve to open the outlet of the third valve to an ambient environment;

opening the third valve; and directing a draining fluid from the lower body of the gate valve to flow horizontally or downward into the ambient environment.

18. The method of claim 12, wherein injecting the sealing fluid through the injection fitting comprises:

closing the third valve;

opening at least one of the first valve or the second valve; and directing the sealing fluid to flow downward from an injection portion of the injection fitting into the lower body of the gate valve.

19. The method of claim 12, wherein the injection fitting is configured to receive the sealing fluid to be flowed, with at least one of the first valve or the second valve opened, to the lower body of the gate valve to seal at least one of the first sealing seat or the second sealing seat, wherein the injection fitting is positioned between the third valve and the gate valve.

20. A valve system, comprising:

a gate valve comprising a lower body configured to be disposed between and fluidly coupled to a first pipe and a second pipe, the first pipe upstream of the lower body and the second pipe downstream of the lower body, wherein the lower body comprises a first sealing seat and a second sealing seat, the lower body defines a first through-hole and a second through-hole on a same side of the lower body, the first through-hole is upstream of the first sealing seat, and the second through-hole is downstream of the second sealing seat; and a side valve assembly comprising:

a first valve configured to be fluidly coupled to the first through-hole of the lower body;

a second valve configured to be fluidly coupled to the second through-hole of the low body;

a third valve configured to be fluidly coupled to the lower body of the gate valve through at least one of the first valve or the second valve; and a threaded plug configured to be removably coupled to an outlet of the third valve, wherein the threaded plug is configured to be removed from the outlet of the third valve to open the third valve to an ambient environment to allow, with the third valve and at least one of the first valve or the second valve opened, draining of the lower body of the gate valve.

* * * * *